United States Patent [19]

Tedesco

[11] Patent Number: 5,614,239
[45] Date of Patent: Mar. 25, 1997

[54] METHOD OF PUFFING PELLETIZED FOODSTUFFS

[76] Inventor: Jon D. Tedesco, 231 Marketplace #246, San Ramon, Calif. 94583

[21] Appl. No.: 443,465

[22] Filed: May 18, 1995

Related U.S. Application Data

[62] Division of Ser. No. 231,158, Apr. 22, 1994, Pat. No. 5,481,962.

[51] Int. Cl.$^6$ ........................................................ A23L 1/18
[52] U.S. Cl. ........................... 426/445; 426/312; 426/465; 426/467; 426/520; 99/323.4; 99/330; 99/348; 99/476; 126/21 A; 219/400; 34/219
[58] Field of Search ................................... 426/312, 445, 426/467, 465, 450, 520; 99/323.4–323.9, 476, 473–475, 330, 340, 348; 126/21 A, 21 R; 219/400, 401, 385; 34/219, 223, 202

[56] References Cited

U.S. PATENT DOCUMENTS

| | | | |
|---|---|---|---|
| 3,329,506 | 7/1967 | Smith, Jr. | 426/467 |
| 3,453,115 | 7/1969 | Clausi | 426/446 |
| 3,462,276 | 8/1969 | Benson | 426/391 |
| 3,502,479 | 3/1970 | Singer | 426/242 |
| 3,506,454 | 4/1970 | Reesman | 426/242 |
| 3,964,175 | 6/1976 | Sivetz | 426/467 X |
| 4,178,843 | 8/1979 | Crabtree et al. | 99/323.8 |
| 4,295,034 | 10/1981 | Assmann | 219/400 |
| 4,375,184 | 3/1983 | Gilliom | 99/422 |
| 4,484,064 | 11/1984 | Murray | 219/400 |
| 4,536,643 | 8/1985 | Erickson | 219/400 |
| 4,581,989 | 4/1986 | Swartley | 99/346 |
| 4,591,698 | 5/1986 | Chang | 219/400 |
| 4,702,158 | 10/1987 | Ishihara | 99/323.5 |
| 4,763,568 | 8/1988 | Kiczek | 99/323.5 |
| 4,817,509 | 4/1989 | Erickson | 99/330 |
| 5,069,923 | 12/1991 | Hubbard et al. | 426/445 |
| 5,134,927 | 8/1992 | McCarthy, III et al. | 99/427 |
| 5,160,829 | 11/1992 | Chang | 219/400 |
| 5,165,328 | 11/1992 | Erickson et al. | 99/330 |
| 5,185,171 | 2/1993 | Bersten | 426/467 |
| 5,245,159 | 9/1993 | Chang | 219/400 |

FOREIGN PATENT DOCUMENTS

| | | |
|---|---|---|
| 143646B | 6/1985 | European Pat. Off. . |
| A3265361 | 4/1988 | European Pat. Off. . |
| 344664 | 12/1989 | European Pat. Off. . |
| A566802 | 10/1993 | European Pat. Off. . |
| 8417848 | 11/1984 | Germany . |
| 1131805 | 10/1968 | United Kingdom . |
| 2013477 | 8/1979 | United Kingdom . |
| 2035779 | 6/1980 | United Kingdom . |
| 2112626 | 7/1983 | United Kingdom . |
| 2119226 | 11/1983 | United Kingdom . |
| 2151124 | 7/1985 | United Kingdom . |

*Primary Examiner*—Milton Cano
*Attorney, Agent, or Firm*—Dennison, Meserole, Pollack & Scheiner

[57] ABSTRACT

Foodstuff pellets are puffed by radiantly heating the pellets in a chamber to cause a rapid rise in the chamber temperature to a temperature sufficient for puffing, and once this temperature has been reached, a fluidizing flow of air is created and maintained within the chamber to agitate, move and suspend the pellets within the chamber while maintaining the puffing temperature causing uniform puffing of the pellets. After puffing of the pellets, the radiant heating is discontinued while the fluidizing flow of air continues to cool the puffed pellets.

10 Claims, 4 Drawing Sheets

METHOD OF PUFFING PELLETIZED FOODSTUFFS

This is a divisional of application Ser. No. 08/231,158 filed Apr. 22, 1994 now U.S. Pat. No. 5,481,962.

BACKGROUND OF THE INVENTION

Pelletized foodstuffs for cereals, toppings, snacks, and a multitude of other purposes have long been known and used as a means for preserving, storing and supplying foods in bulk and on a commercial scale. The raw materials of known pellets include, among others, wheat, corn, rice, potatoes, admixtures thereof, and the like. The pellets, usually subsequent to puffing, can be coated as desired for flavoring, enrichment, etc.

The puffing or expanding of the pellets has heretofore principally been done on a commercial scale using industrial ovens wherein, most commonly, the pellets are expanded utilizing oil as a heating medium. As will be appreciated, in the modern environment of low fat foods, oils of substantial all types, as well as foods containing such oils are, for health reasons, falling out of favor.

It has also been known, on a commercial scale, to expand the pellets in industrial ovens by utilization of hot air. Such operations, for commercial purposes, normally rely on a continuous flow-through of the products and require an industrial environment for production.

The only attempts heretofore made for domestic use of raw pellets, that is conversion or puffing of the pellets at the time of home consumption, has been through use of home microwave or conventional convection ovens. However, such attempts have been generally unacceptable, particularly when using the conventionally formed pellets. This can be due to any number of problems including partial or uneven expansion, cooking or baking of the pellets rather than puffing, agglomeration, and the like.

SUMMARY OF THE INVENTION

The present invention is concerned with means which will allow the consumer, in the home or home environment to utilize the basic pellets, to expand or puff the pellets in small batches as required in a rapid, inexpensive and trouble-free manner and using a small appliance no more complicated or difficult to use than conventional kitchen appliances. Thus, the ultimate consumer will be able to avail himself/herself of all of the advantages of the pelletized materials, such as preservation of freshness, ease of storage, and the like.

While the apparatus of the invention, basically a countertop oven, is particularly contemplated for home use, it is also considered probable that such ovens, with possibly a slightly greater capacity, will find practical use in stores whereby the store clerk or consumer can, without the necessity of having an individual home appliance, puff the pellets at the time of purchase and, presumably proximate the time of consumption. Such a purchasing procedure can be somewhat equated to the selection and grinding of coffee beans at the store prior to purchase. The highly desirable advantages of bulk storage, preservation, and the like are retained until such time as the product is actually sold to the final consumer.

Basically, the heating of the pellets, for puffing or expansion thereof, is to be effected in a closed environment in approximately 30 to 45 seconds utilizing an agitating flow of rapidly heated hot air which completely surrounds and entrains or "fluidizes" the individual pellets.

More specifically, after introduction of the pellets into a closed container, a heating element therein or communicated therewith is rapidly, that is within approximately 10 seconds, brought to a temperature of 375° Fahrenheit or slightly thereabove. The heating element is so positioned as to, within this first 10 seconds, subject the pellets to radiant heat to encourage very rapid heating of the pellets. As the desired heat is reached or slightly exceeded, this is sensed by an appropriate sensor and a timer actuated to turn on a fan which forcibly moves air through the heating element and into the container, or chamber defined thereby, to agitate and rapidly move the pellets to ensure a flow of the hot air completely about the pellets. This agitation and flow is substantially and effectively enhanced by configuring the inner wall of the container to cause a flow along the sides of the chamber from the heater-mounting apparatus to the bottom, and at the bottom to reverse direction and travel upward, either centrally through the chamber or spirally therein. The agitated flow of approximately 375° air continues for about 10–15 seconds during which appropriate thermostatic means cycles or otherwise controls the heating element so as to maintain the temperature. This period is set by the timer or timing means and automatically shuts off the heater after a preselected period contemplated to effect completion of the expansion of the particular pellets utilized. The rapid heating and delay of agitating air flow until the desired temperature is reached is essential to ensure puffing rather than cooking or baking of the pellets as would occur in a conventional convection or microwave oven.

Subsequent to a discontinuation of the heat, the fan continues to operate to effect a rapid cooling of the now puffed product. This last cycle can be terminated by timer-controlled means or a temperature sensor which senses a drop in temperature to below approximately 300°. It is contemplated that this cooling cycle take approximately 15 to 20 seconds for an overall time of approximately 30 to 45 seconds for the entire operation. The container can then be removed and the pellets consumed, flavored, used as toppings, or otherwise used in any manner commensurate with the product itself. The chamber, other than for possibly the presence of some crumbs or particles, remains clean and dry. There is no oil residue, nor residual moisture in that any moisture in the pellets, usually initially about 10–12%, is boiled off by the hot agitating air which effects the puffing or expansion of the pellets.

Structurally, the countertop oven includes a base, a support tower rising from one end thereof which may include the motor, circuitry, controls and the like, a top assembly projecting forwardly from the upper end of the tower in overlying space relation to the base, and the container, preferably with a projecting handle. The container is slidably introduced between the base and top assembly, sealing, although not necessarily in an airtight manner, to the underface of the top assembly peripherally about the open upper end of the container.

The top assembly mounts a resistance heating element, preferably in the nature of a tightly coiled wire assembly sufficient to rapidly heat, within approximately 10 seconds, to 375° Fahrenheit or more. A fan is mounted adjacent to the heating element for the downward direction of airflow thereby and into the interior of the container. The fan is preferably powered by a fan belt engaged over pulleys mounted respectively on the fan shaft and the motor shaft. As desired, the pulley on the motor shaft can include fan blades to induce a slight air flow to cool the motor during operation of the fan. Appropriate heat sensing and timing means can be mounted either in the support tower or the top assembly, and the control buttons appropriately externally exposed.

In order to provide the necessary enhancement of the agitation of the pellets, induced by the high speed forced flow of air, the interior of the container or chamber, and preferably the bottom thereof, is provided with flow enhancing means which can comprise a central conical peak surrounded by an annular semi-toroidal configuration of the chamber bottom, thus inducing a toroidal flow of air moving either down the substantially cylindrical side wall inward and upward through the center of the chamber, or in the opposite direction, centrally downward through the chamber and upwardly and outwardly along the side wall thereof.

In another embodiment, and providing a more effective air flow, a ramp can be provided which spirals rather sharply upward from the bottom of the chamber for about three-quarters of the height of the chamber. Such a ramp causes an upward elliptical flow pattern to the particles which allows utilization of substantially the full height of the chamber and a highly effective air flow of the air completely about the individual particles, such being essential for an even and full puffing or expansion of the pellets.

DESCRIPTION OF PREFERRED EMBODIMENTS

Figure 1:
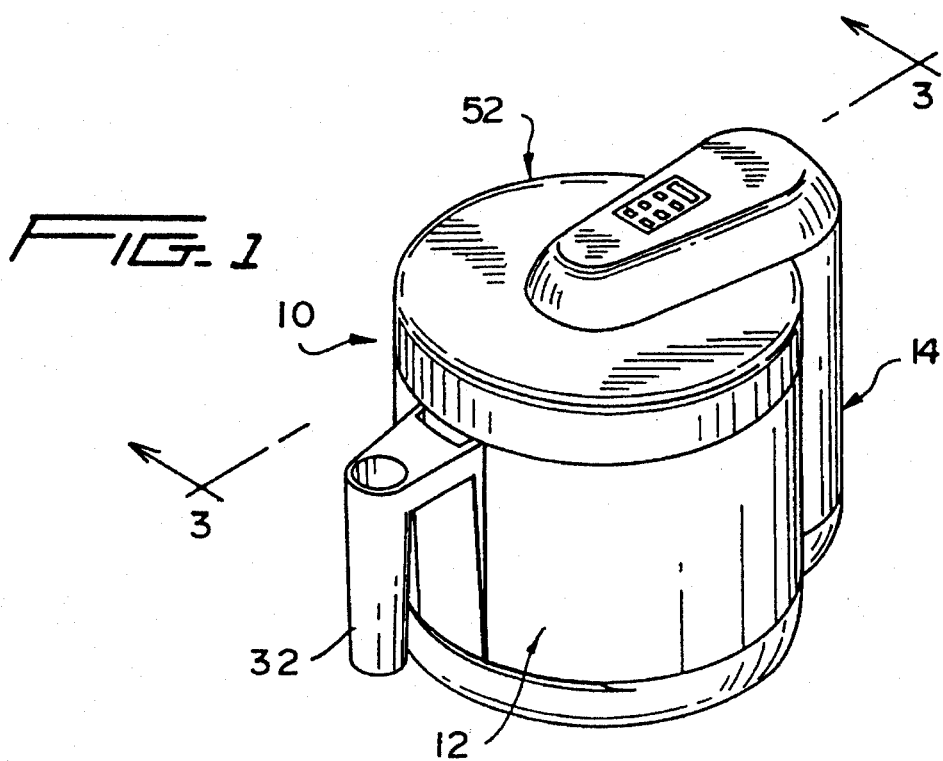
FIG. 1 is a perspective view of the puffing oven comprising the invention.
Figure 2:
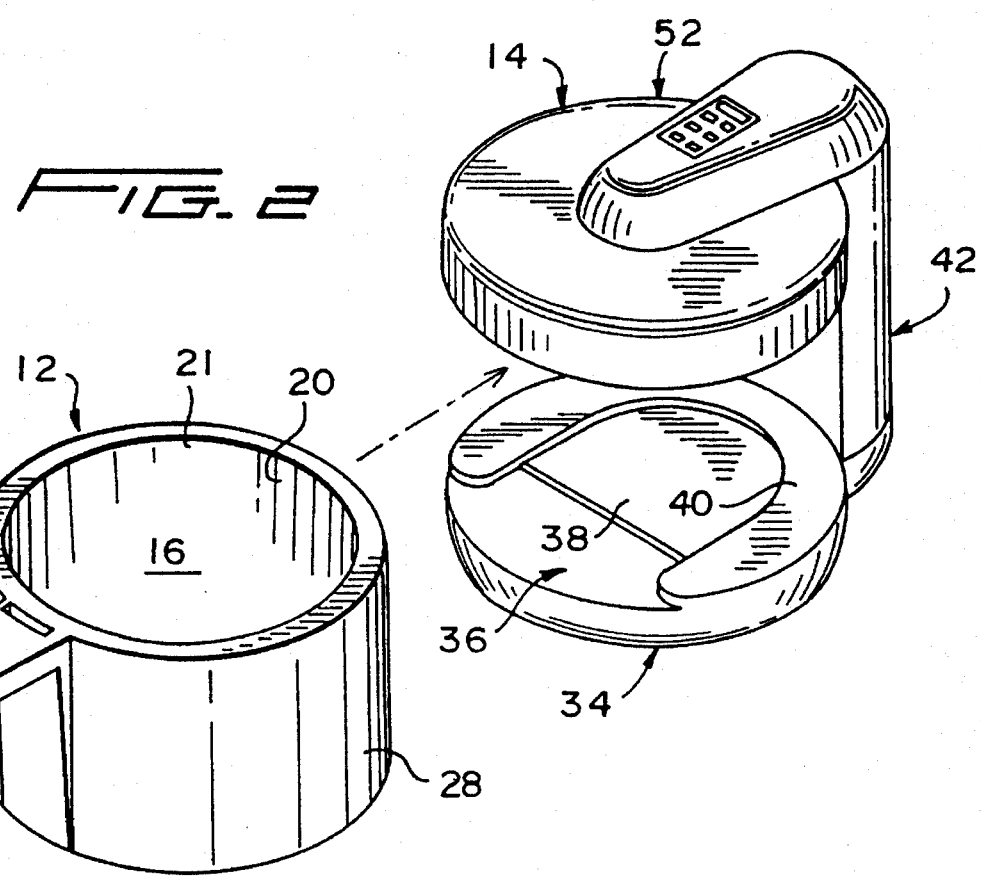
FIG. 2 is a perspective view with the container exploded from the housing.

The countertop puffing oven 10 comprises a container 12 and a housing 14 which selectively receives the container 12.

The container 12 includes an inner puffing chamber 16 defined by a bottom or bottom wall 18 with an integral cylindrical side wall 20 extending upward therefrom and defining, at its upper end, an open mouth 21. While the side wall 20 has been indicated as cylindrical, this wall may slightly flare outwardly upward from the bottom wall 18. Further, the annular transition area 22 between the generally circular bottom wall 18 and the side wall 20 follows a smooth arc whereby air flow downwardly induced along the cylindrical side wall 20 will be radially inwardly directed along the bottom wall 18.

The bottom wall 18, centrally thereof, is formed to define an upwardly projecting conical projection 24. The transition area between the base periphery of the projection 24 and the planar annular portion of the base 18 immediately outward thereof follows an arc as at 26. Thus formed, air flowing radially inward along the bottom 18 from the side wall 20 will be upwardly directed centrally of the chamber 16 providing for a generally toroidal flow path induced by the generally semi-toroidal configuration of the base 18.

The container 12, depending upon the heat accommodating capability of the material used, can be double walled, with a protective outer wall 28 as illustrated. It is also contemplated that the container include a depending base or stand, preferably circular to correspond to the circular bottom. For ease of handling or manipulating the container 12, an appropriate projecting handle 32 can also be provided.

The housing 14 includes a base 34 with an upper support platform 36 having a slightly raised planar central portion 38 which defines the operative position of the housing-received container. A positioning collar, in the nature of a further upwardly stepped portion 40 on the platform 36, extends about three sides of the central raised portion 38 and opens laterally to the fourth side thereof for reception of the container base or stand 30 in a guided manner therein.

A support tower 42 is fixed to the periphery of the base 34, preferably immediately outward thereof, and radially aligned with the inner portion of the base 34, that is the side thereof diametrically opposed from the side through which the container 12 will be introduced and removed. As noted in the assembly view of FIG. 4, the tower can be formed of opposed panels 44 and 46 bolted together for easy assembly and disassembly, as well as for access to the components interior thereof, particularly the electric drive motor 48, the power cord 50, and such controls as are to be appropriately concealed therein.

A top portion or dome 52 is fixed to the upper end of the tower 42 and cantilevered forwardly therefrom to overlie the base 34 in upwardly spaced parallel relation thereto with the height therebetween being such as to closely receive the container 12, as to be explained.

A mounting plate 54 is secured within and actually forms the inner wall of the dome 52.

A circular diverter plate 56 is supported by the mounting plate 54 in parallel closely spaced underlying relation thereto. The diverter plate 56 is formed with an annular downwardly directed groove 58 peripherally thereabout which in turn defines an inner annular diverting wall 60 flaring downwardly and slightly outward and defining a downwardly directed compartment 62.

A multiple coil circular heating element 64, sandwiched between an overlying mica plate 66 and underlying mica ring 68, is positioned within the compartment 62 in general lateral alignment with the surrounding downwardly and outwardly tapering diverting wall 60. The heating element is capable of generating radiant heat and will reach a temperature of at least approximately 375° Fahrenheit in approximately 10 seconds and maintain such temperature as required, utilizing, preferably, a 20 amp circuit and 1500 to 1600 watt system. A centrifugal fan blade 70 is positioned coaxially within the coiled heater element 64 on a vertically extending shaft 72 mounted to the mounting plate 54 through an appropriate bearing assembly 74. The driving of the fan or fan blade 70 is preferably effected utilizing an endless drive belt 76 engaged about a pulley 78 mounted to the fan shaft 72 and a similar pulley 80 mounted to the drive shaft 82 of the motor 48. For protection of the contents of the chamber 16, as well as the fan 70 itself, an appropriate underlying screen 84 is provided immediately below the lower annular mica plate 68 and fan 70.

Upon activation of the fan 70, for example by the use of a thermal sensor, the induced air flow therefrom discharges radially outward through the heating element 64 to impinge upon and be downwardly diverted by the surrounding diverter wall 60. The inclination of this diverter wall 60 guides the airflow toward the adjacent inner wall 20 of the chamber 16 of a received container 12 with the rotational axis of the fan causing a swirling motion to the air along the wall 20. This flow of air, upon moving to the bottom of the chamber 16, is inwardly guided along the semi-toroidal configuration of the bottom and subsequently upwardly directed to achieve a wave-like inversion. The air flow, which may achieve a linear flow of approximately 2,500 to 4,000 feet per minute, is such as to cause, in conjunction with the guiding or agitating bottom 18, a positive and continuous agitation of pellets received within the chamber for puffing, with the speed adjusted in accord with the weight of the particular pellets involved.

In this manner, the pellets, without requiring any specific support structure, racks or the like, are, during the full period of agitation within the chamber, constantly exposed on the complete surface area thereof to the heated air, thus providing a degree of heat transfer substantially equivalent to that obtained in a hot oil cooker without the use of oil and utilizing only hot air.

Figure 4:
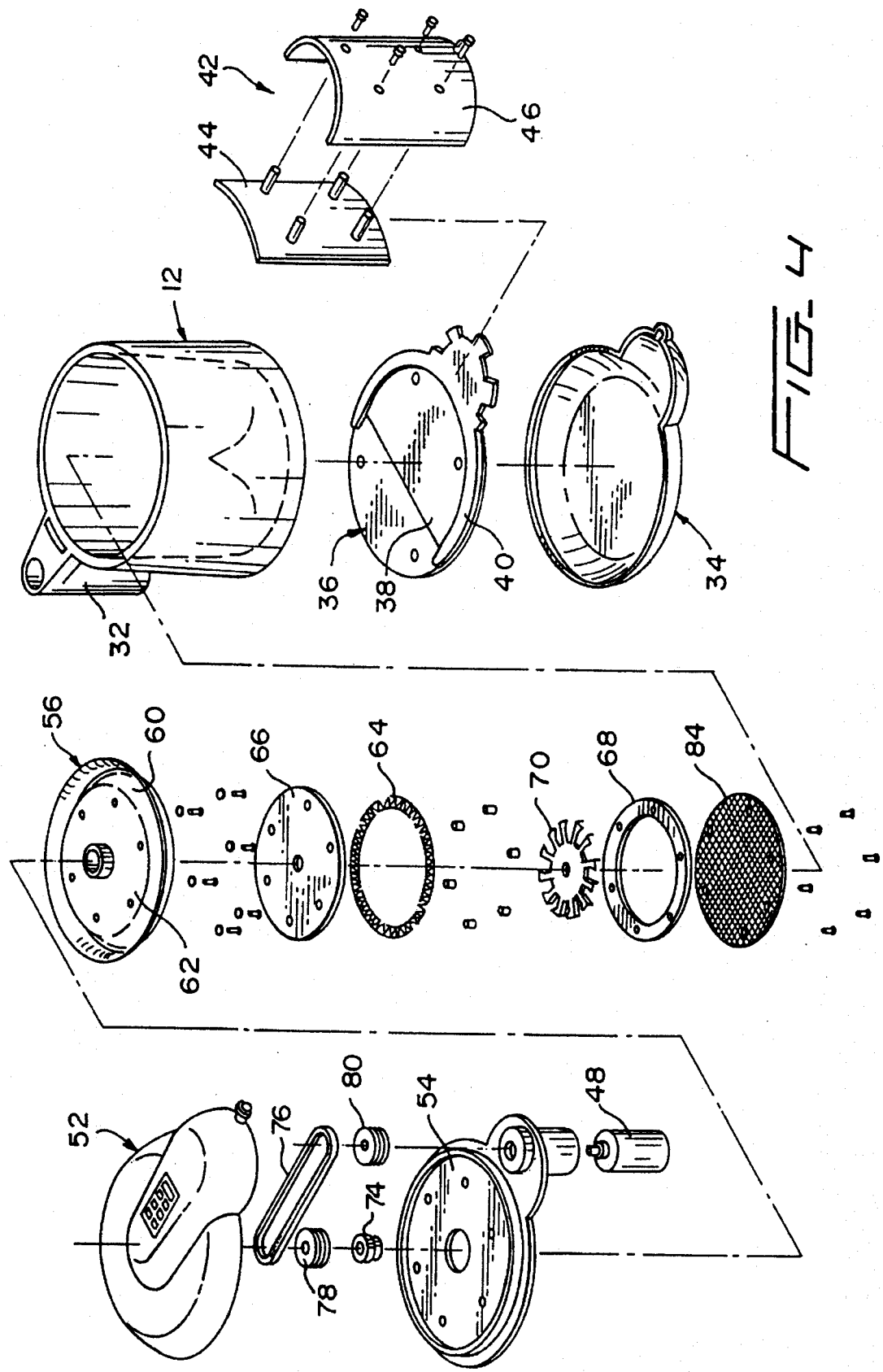
FIG. 4 is an exploded perspective view of the components of the apparatus.

With reference to FIG. 4, selected ones of the components have, for purposes of schematic illustration, been illustrated in disassembled relationship.

Figure 5:
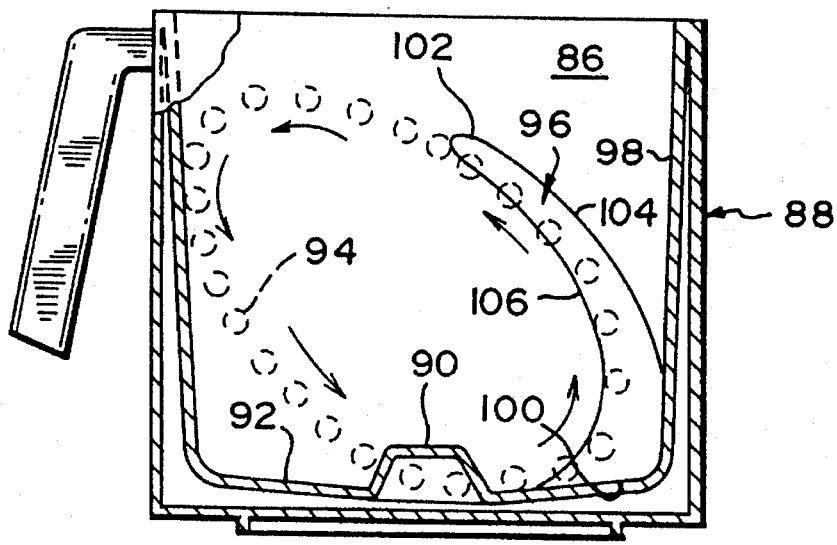
FIG. 5 is a cross-sectional detail through a container with a modified form of agitation means therein.

With reference to FIG. 5, the chamber 86 of the container 88 therein utilizes a modified form of agitation system wherein the central projection 90 of the bottom wall 92 is of a lower truncated configuration. The main agitation and directing of the air-induced flow of the particles 94 is more specifically achieved by an upwardly directed ramp 96 spirally about the inner chamber wall 98 from a lower end 100 engaged with and forming a smooth transition from the bottom wall 92. The lower portion of ramp 96 extends radially inward from the side wall 98 to approximately the central projection 90, with the ramp extending to an upper discharge end portion 102 at approximately three-quarters of the height of the chamber 86 above the bottom 92. The ramp 96 includes an outer edge 104 intimately engaged with the wall 98, and an inner edge 106 inwardly positioned relative thereto and to the chamber wall 98. As will be appreciated from FIG. 5, the inner edge 106 gradually converges upwardly toward the chamber wall 98 and the ramp outer edge 104, thus tending to provide for a discharge of the swirling pellets at varying heights above the bottom to achieve a greater dispersion of the pellets within the hot air and a greater utilization of the entire interior of the chamber. As desired, the ramp 96 may also be slightly inclined in the direction of flow from the outer edge 104 to the inner edge 106 to enhance the inward movement of the discharging pellets away from the chamber wall notwithstanding the generally circular movement thereof induced by the initial air flow from the fan.

Figure 3:
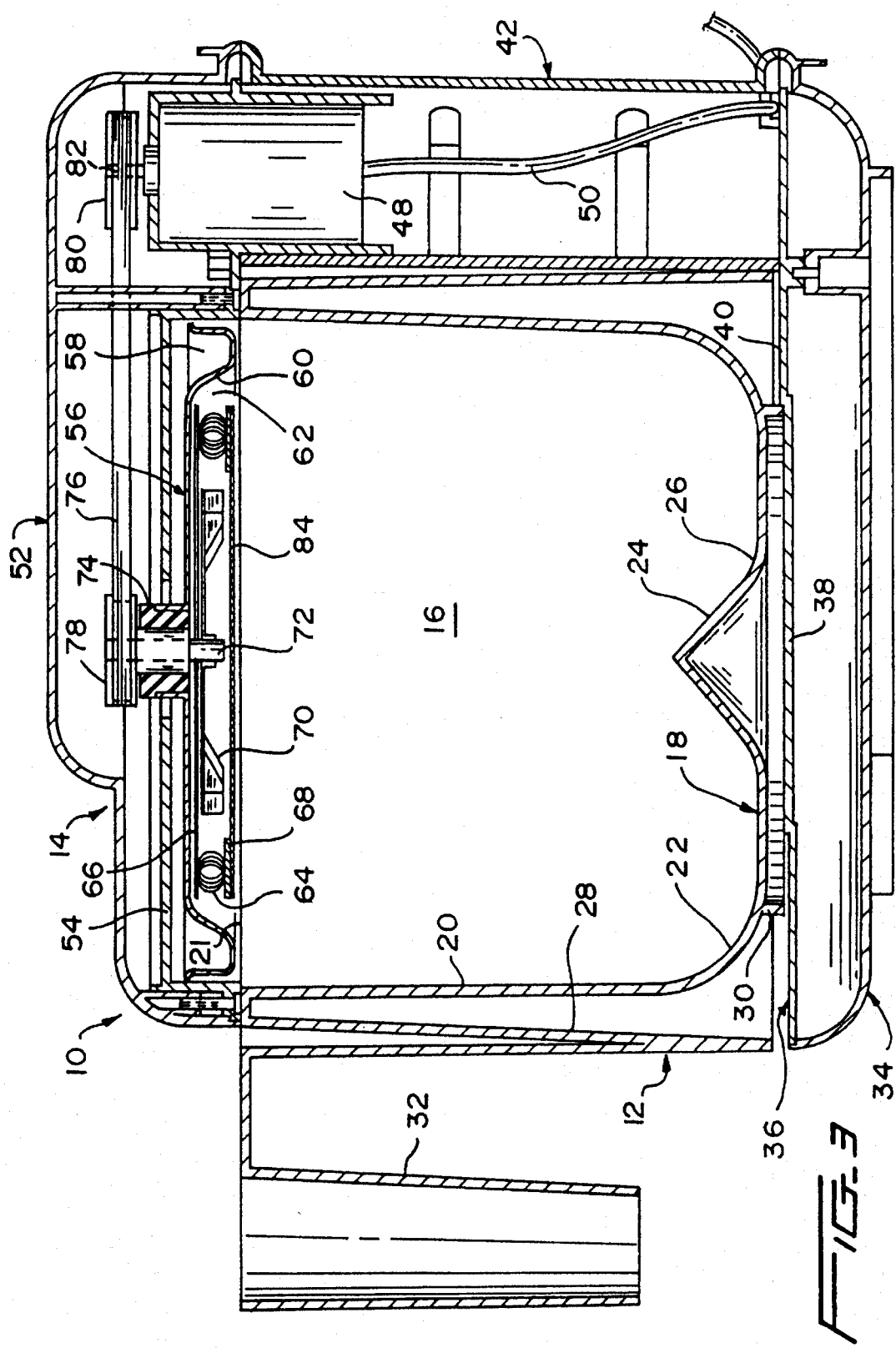
FIG. 3 is an enlarged transverse cross-sectional view taken substantially on a plane passing along line 3—3 in FIG. 1.
Figure 6:
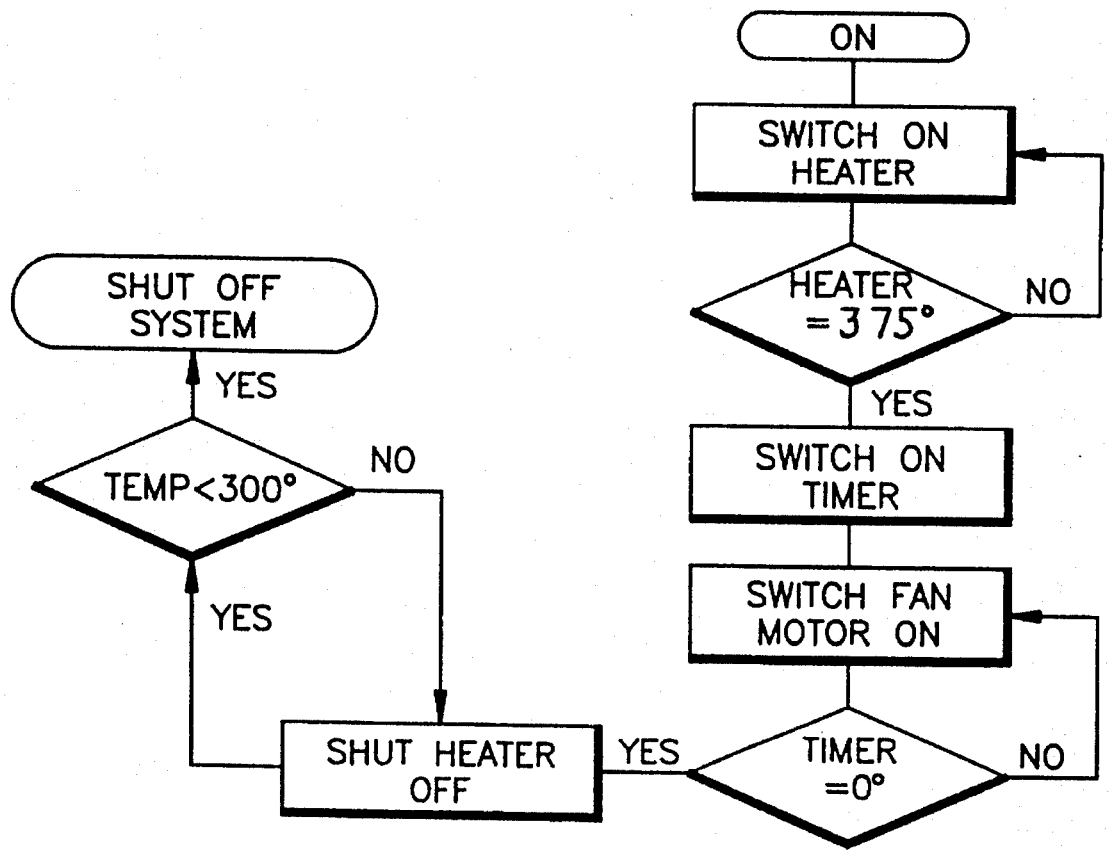
FIG. 6 is a flow diagram of the operating system.

With reference to FIG. 3 and the diagrammatic illustration of FIG. 6, the container is first supplied with the pellets to be puffed. The container is then introduced into the housing with the elevated central portion 38 of the base platform 36 receiving the container stand 30 and upwardly positioning the container to seal the upward rim thereof to a corresponding depending rim-like portion of the overlying dome 52. This is not necessarily a hermetic seal as some minimal air leakage will not affect the operation of the oven and in fact may enhance subsequent cooling. It will also be noted that the diverting wall 60 about the chamber which receives the heating element 64, is so angled as to downwardly direct the heated air flow below the upper rim of the received container.

After a positioning of the container, the system or apparatus is turned on and, depending on the sophistication of the control system, the time parameters, within a very limited degree, can be set. Such adjustment would be desirable to accommodate minor variations in the length of time needed to puff the specific pellets. Initially, the heating element is activated with the temperature thereof, within approximately 10 seconds, raising to approximately 375° Fahrenheit, or slightly thereabove whereby a temperature of 375° Fahrenheit can be rapidly established and maintained throughout the container chamber. During this initial heating, the pellets are subjected to radiant heat which provides a degree of preheating, which preheating, it will be understood, is not such as will "cook" rather than puff the pellets.

When the desired temperature has been reached, this is sensed by an appropriate thermal sensor which activates the fan, causing the desired air flow, pellet movement, and agitation in conjunction with the specifically configured agitation means within the chamber itself.

The heater remains on for a predetermined heating cycle during which the approximately 375° temperature is maintained. This may require a repeated recycling of the heating element. This cycle or time period is generally in the order of 10 to 15 seconds which, at the designated heat, and in light of the complete surface contact with the pellets, will effect a complete puffing of the pellets without a cooking, baking, burning or otherwise adverse effect on the pellets. Upon a deactivation of the heating element, which will normally be achieved by a timer means activated in conjunction with the activation of the fan, the fan continues to move the air, cooling the product and, if necessary, preventing agglomeration. It is contemplated that the cooling cycle, after deactivation of the heating element, be approximately 15 to 20 seconds with the secession or deactivation of the fan being either timer controlled or responsive to a sensing of the decreased temperature, for example 300°, by a thermal sensor. The container can then be slid from the housing and the puffed foodstuffs served or stored.

Should it be desirable to enhance the utility of the puffing oven, particularly as the basic elements of a conventional oven are provided, including the heating element, sealed chamber, and the like, this can be done by providing appropriate control means. More particularly, with variable timer controls, the actual time at maximum heat can be reduced which will enable use of the oven as a means for refreshing snack foods, roasting coffee beans, and the like.

As a alternate to varying the time, or as an adjunct thereto, controls for varying the temperature whereby a lower maximum temperature is utilized, can also be effective in adapting the oven for tasks other than puffing, for example the refreshing of snack foods and roasting of coffee beans as noted above. Provision can also be made for independently controlling and or adjusting the air flow speed.

Thus, while the principal function of the oven is for the puffing of pellets, and the construction of the oven, as well as the method of use involved, are directed toward this end, versatility in the use of the oven for other tasks is both practical and readily achieved.

The foregoing is illustrative of the invention, and as structural variations may occur within the scope of the invention, protection is not to be limited to the specifically disclosed embodiments. Rather, it is intended the invention encompass all obvious embodiments within the parameters of the claims following hereinafter.

I claim:

1. A method for puffing foodstuff pellets, comprising the steps of:

introducing a predetermined quantity of pellets into a puffing chamber;

radiantly heating the pellets in said chamber to cause thereby a rapid rise in chamber temperature to a predetermined temperature sufficient for puffing;

after the chamber temperature has reached said predetermined temperature, creating and maintaining a pellet fluidizing flow of air within said chamber sufficient to agitate, move and suspend said pellets within said chamber while maintaining chamber temperature at said predetermined puffing temperature, causing thereby uniform puffing of said pellets;

discontinuing the radiant heating after puffing of said pellets; and subsequently discontinuing the pellet fluidizing flow of air.

2. The method of claim 1 wherein the flow of heated air is directed along a closed recirculating path within and about the interior of said chamber.

3. The method of claim 2 wherein said air temperature is raised to at least approximately 375° fahrenheit.

4. The method of claim 3 wherein the chamber is maintained at said predetermined puffing temperature for a time period of approximately 8 to 10 seconds and the pellet fluidizing air flow created within this time period to initiate puffing of the pellets without cooking or agglomeration thereof.

5. The method of claim 1 wherein the chamber is maintained at said predetermined puffing temperature for a time period of approximately 8 to 10 seconds and the pellet fluidizing air flow created within this time period to initiate puffing of the pellets without cooking or agglomeration thereof.

6. The method of claim 1 wherein the flow of heated air is directed along a closed recirculating path within and about the interior of said chamber.

7. The method of claim 11 wherein said air temperature is raised to at least approximately 375° fahrenheit.

8. A method of puffing foodstuff pellets in a chamber wherein said chamber is exposed to heating means and air flow generating means, the steps of said method comprising:

introducing a preselected amount of pellets into said chamber;

raising the air temperature in said chamber to at least a temperature of approximately 375° F., a temperature sufficient to puff the pellets, while subjecting said pellets to radiant heat;

creating and maintaining a pellet fluidizing flow of heated air directed along a closed recirculating path within and about the interior of said chamber sufficient to agitate, move and suspend said pellets within said chamber and expose the surface of said pellets to the heated air for a uniform puffing of said pellets, said flow of heated air being maintained for 8 to 10 seconds at said puffing temperature, a time sufficient for puffing of said pellets without cooking or agglomeration thereof;

discontinuing heating of said puffed pellets; and removing said puffed pellets from said chamber.

9. A method for operating a countertop puffing oven, said method comprising the steps of:

activating heater means to achieve a puffing temperature of at least approximately 375° Fahrenheit within approximately 8 to 10 seconds;

activating air flow generating means when said puffing temperature is reached, and maintaining said puffing temperature for approximately 10 to 15 seconds;

deactivating said heater means; and deactivating said air flow generating means subsequent to deactivation of said heater means and reduction of said puffing temperature.

10. The method for operating the oven of claim 9 further comprising the step of:

activating preselected timing means for maintaining said temperature.

* * * * *